UNITED STATES PATENT OFFICE.

FRANZ GRAUPNER, OF EVANSVILLE, INDIANA.

IMPROVEMENT IN COMPOUNDS FOR DYEING.

Specification forming part of Letters Patent No. 117,620, dated August 1, 1871.

*To all whom it may concern:*

Be it known that I, FRANZ GRAUPNER, of Evansville, in the county of Vanderburg and State of Indiana, have invented a new and valuable Improvement in Compound for Dyeing; and I do hereby declare that the following is a full, clear, and exact description of the same.

My invention relates to dyeing cotton, woolen, or other fabrics; and consists in a novel compound and process intended to operate efficiently for the purpose named.

In order to give an intelligent description of my invention, I deem it proper first to describe the manner in which two of the principal ingredients used are themselves compounded.

The first of these ingredients I call muriatic oxide of copper. This is formed by taking, say, twelve pounds of blue vitriol, (sulphate of copper,) placing it in an iron kettle, and burning it until it is white, or rather a bluish white. After the contents of the vessel become cold I place them in a stone crock and mix with them, say, sixteen pounds of muriatic acid. I next place the new mixture in a sand-bath and boil it down about one-third in bulk, and add, say, twelve pounds of water. If, instead of adding the water, I permit the mixture to cool, it will crystallize, and thereby form what I call crystallized muriatic oxide of copper. The second preparation mentioned above I call the muriate of zinc. This is formed as follows: I take, say, ten pounds of muriatic acid, and, having placed it in a stone crock, I add, say, one pound of water, and dissolve in the liquid as much zinc as can be held in solution; then place the compound in a sand-bath and boil it down to one-half its original bulk; then bottle up the residue and it is ready for use.

My preparation for dyeing, which I call the "Universal Preparation," is compounded as follows, namely: In a copper or stone kettle I place, say, eight pounds of boiling water and one pound of sal-ammoniac. After these unite I add fourteen pounds muriatic oxide of copper and one-half pound muriate of zinc. Stir the mixture well, and, when thoroughly united, place it in a glass bottle for use, as hereinafter mentioned.

To color cotton goods black I dissolve forty-five pounds of the extract of logwood, and twenty pounds catechu in one hundred and eighty gallons of boiling water. To this mixture I add twenty-six pounds of my "Universal Preparation," or the equivalents thereof, in crystallized muriatic oxide of copper, sal-soda, and muriate of zinc.

In this liquid compound about three hundred pounds of cotton may be placed with water sufficient to cover the same, and after boiling a few minutes the cotton will be dyed a beautiful black color. The goods should then be taken from the fluid, rinsed, and pressed, and immersed again in a solution of sal-soda and bichromate of potash. The dye mixture should be saved for future use.

For dyeing a blue-black color the process is the same, except that the catechu is not used. For a brown color I use the extract of heipemic in place of the extract of logwood. For coloring wool and its products I use the same materials I have described above, and the same process, but care is required that too much dye-stuff be not mixed with the residue of the preparation, and a little longer time is required for boiling. Half an hour, however, is generally sufficient for that purpose.

What I claim as my invention, and desire to secure by Letters Patent, is—

1. The combination of sulphate of copper, muriatic acid and zinc, by the process and for the purpose substantially as specified.

2. The dyeing compound herein described, formed of the materials and in the proportions substantially as specified.

3. The process, herein described, of dyeing fabrics by the means substantially as specified.

In testimony that I claim the above I have hereunto subscribed my name in the presence of two witnesses.

FRANZ GRAUPNER.

Witnesses:
J. M. HARRIS,
F. SCHMADEL.